(12) United States Patent
Kim

(10) Patent No.: US 8,418,707 B2
(45) Date of Patent: Apr. 16, 2013

(54) FIXING DEVICE OF SPORTS STICK WITH VARIABLE LENGTH

(75) Inventor: Young Se Kim, Seoul (KR)

(73) Assignee: Min Sung Precision Co., Ltd., Bucheon-Si, Gyeonggi-Do (KR)

( * ) Notice: Subject to any disclaimer, the term of this patent is extended or adjusted under 35 U.S.C. 154(b) by 425 days.

(21) Appl. No.: 12/672,568

(22) PCT Filed: Jul. 11, 2008

(86) PCT No.: PCT/KR2008/004081
§ 371 (c)(1),
(2), (4) Date: Feb. 8, 2010

(87) PCT Pub. No.: WO2009/020290
PCT Pub. Date: Feb. 12, 2009

(65) Prior Publication Data
US 2012/0000497 A1    Jan. 5, 2012

(30) Foreign Application Priority Data

Aug. 7, 2007  (KR) .................. 10-2007-0078830
Mar. 17, 2008  (KR) .................. 10-2008-0024400

(51) Int. Cl.
*A45B 9/00* (2006.01)

(52) U.S. Cl.
USPC .............................................. 135/75; 135/65

(58) Field of Classification Search ............ 135/65, 135/75
See application file for complete search history.

(56) References Cited

U.S. PATENT DOCUMENTS

| 4,134,703 A | * | 1/1979 | Hinners ............. 403/104 |
| 5,458,427 A | * | 10/1995 | Simond ............ 403/109.5 |
| 5,876,147 A | * | 3/1999 | Longo ............. 403/109.5 |
| 6,202,663 B1 | * | 3/2001 | Uemura ................ 135/65 |
| 6,250,839 B1 | * | 6/2001 | Lenhart ............ 403/109.5 |
| 6,595,226 B2 | | 7/2003 | Uemura |
| 2005/0207829 A1 | * | 9/2005 | Lenhart ............ 403/109.5 |
| 2006/0204322 A1 | * | 9/2006 | Roiser .............. 403/109.5 |

FOREIGN PATENT DOCUMENTS

| JP | 3050968 U | 8/1998 |
| JP | 11-318526 A | 11/1999 |
| KR | 20-0396678 Y1 | 9/2005 |

OTHER PUBLICATIONS

International Search Report of International Application No. PCT/KR2008/004081.

* cited by examiner

*Primary Examiner* — David Dunn
*Assistant Examiner* — Danielle Jackson
(74) *Attorney, Agent, or Firm* — Kile Park Reed & Houtteman PLLC

(57) ABSTRACT

The present invention relates to a sports stick with a variable length including an upper tube to which a hand grip is connected, a lower tube adapted to be inserted into and withdrawn from the upper tube, and fixing means adapted to securely fix the lower tube to the upper tube, wherein the fixing means includes: a rod body disposed inside the lower tube at one side periphery thereof in such a manner as to be mounted inside the upper tube at the other side periphery thereof by the sequential formation of a screw thread portion and a flat portion along the outer periphery thereof; a tapered member adapted to be fixed to the flat portion formed along the outer periphery of the rod body and having a tapered surface formed along the outer periphery thereof; and a pressurizing member mounted at the screw thread portion formed along the outer periphery of the rod body in such a manner as to encompass the tapered member.

7 Claims, 11 Drawing Sheets

US 8,418,707 B2

FIXING DEVICE OF SPORTS STICK WITH VARIABLE LENGTH

TECHNICAL FIELD

The present invention relates to a sports stick, and more particularly, to a sports stick with a variable length that can improve a fixing force thereof by using a tapered member having a tapered outer peripheral surface when it is desired to adjust the length of the sports stick.

BACKGROUND ART

Sports sticks used generally include climbing sticks and ski sticks. The sports sticks are designed in the form of a general stick needed for the purpose of body balancing, reduction of physical fitness consumption, and rapid and easy walking during climbing a mountain covered with snow or climbing a general mountain, and normally, the sticks are adjustable to desired lengths.

The stick is configured in a two-stepped or multi-stepped fashion in such a manner as to be freely adjustable to a desired length according to a user's physical shape.

FIG. 1 is a cross-sectional view showing a conventional sports stick, FIG. 2 is a cross-sectional view showing a portion 'A' in FIG. 1 wherein the fixing means of the conventional sports stick is released from its fixing state, and FIG. 3 is a cross-sectional view showing the portion 'A' in FIG. 1 wherein the fixing means of the conventional sports stick is at a fixing state.

As shown in FIGS. 1 to 3, the conventional sports stick includes: an upper tube 10 constituting the outer shape thereof; a lower tube 20 having a smaller diameter than the upper tube 10 and adapted to be inserted into and withdrawn from the upper tube 10. The upper tube 10 has a cap member 70 disposed at the lower end periphery thereof in such a manner as to cover a portion of the lower tube 20 inserted into the upper tube 10, and fixing means 1 is disposed between the upper tube 10 and the lower tube 20 so as to adjust the length of the lower tube 20 to be withdrawn from the upper tube 10.

The fixing means 1 includes a friction member 40, a pressurizing member 60, and an escape-preventing member 50.

The friction member 40 is disposed inside the lower tube 20 of the stick in such a manner as to be fixed to a rod body 30 having a predetermined length exposed from the top end of the lower tube 20. At this time, the friction member 40 has a tapered surface formed along the top end outer periphery thereof and has a parallel surface to the lengthwise direction along the lower end outer periphery thereof. The pressurizing member 60 is mounted on the rod body 30 after the friction member 40 is secured to the rod body 30.

After the pressurizing member 60 is mounted on the rod body 30, the escape-preventing member 50 is fastened along the uppermost end periphery of the rod body 30 so as to prevent the pressurizing member 60 from escaping from the rod body 30.

In order to adjust the length of the stick, as shown in FIG. 2, if the lower tube 20 is taken by a user's hand and the upper tube 10 is turned in a screw-unfastening direction to release the fixing state of the fixing means 1 to the upper tube 10, the pressurizing member 60 is moved upwardly along the outer peripheral surface of the friction member 40 such that the fixing means 1 is released from the fixing state thereof.

After the length of the stick is adjusted, if the lower tube 20 is taken by the user' hand and the upper tube 10 is turned in a screw-fastening direction, as shown in FIG. 3, the fixing means 1 is fixed to the upper tube 10. That is, since the pressurizing member 60 is brought into close contact with the upper tube 10, it is moved downwardly along the screw portion of the rod body 30 by the force generated upon turning the upper tube 10. The pressuring member 60 is moved downwardly along the tapered surface formed on the top end periphery of the friction member 40 fixed to the rod body 30 and is extended in the diameter by the groove formed in a lengthwise direction thereof, thereby coming into close contact with the upper tube 10 and fixing to the upper tube 10. At this time, the inner peripheral surface of the pressurizing member 60 is point-contacted with the tapered surface of the friction member 40.

In other words, since the pressurizing member 50 and the friction member 40 being at the point-contacted state therebetween do not have any reliable fixing force to the upper tube 10, the fixing means 1 being at the fixing state is unexpectedly released due to the strong load applied to the downward direction of the stick while in use, which gives many inconveniences in use and does not ensure a user's safety.

DISCLOSURE OF INVENTION

Technical Problem

Accordingly, the present invention has been made in an effort to solve the above problems occurring in the prior arts, and it is an object of the present invention to provide a sports stick with a variable length that provides a reliable fixing force between fixing means and the stick so as to stably maintain the adjusted length of the stick and to endure the relatively strong load applied to the stick.

Technical Solution

To achieve the above object, according to one aspect of the present invention, there is provided a sports stick with a variable length including an upper tube to which a hand grip is connected, a lower tube adapted to be inserted into and withdrawn from the upper tube, and fixing means adapted to securely fix the lower tube to the upper tube, wherein the fixing means includes: a rod body disposed inside the lower tube at one side periphery thereof in such a manner as to be mounted inside the upper tube at the other side periphery thereof by the sequential formation of a screw thread portion and a flat portion along the outer periphery thereof; a tapered member adapted to be fixed to the flat portion formed along the outer periphery of the rod body and having a tapered surface formed along the outer periphery thereof; and a pressurizing member mounted at the screw thread portion formed along the outer periphery of the rod body in such a manner as to encompass the tapered member.

To achieve the above object, according to another aspect of the present invention, there is provided a sports stick with a variable length including an upper tube to which a hand grip is connected, a lower tube adapted to be inserted into and withdrawn from the upper tube, and fixing means adapted to securely fix the lower tube to the upper tube, wherein the fixing means includes: a rod body disposed inside the lower tube at one side periphery thereof in such a manner as to be mounted inside the upper tube at the other side periphery thereof by the sequential formation of a first flat portion, a screw thread portion and a second flat portion along the outer periphery thereof; a tapered member adapted to be fixed along the second flat portion formed along the outer periphery of the rod body and having a tapered surface formed along the outer periphery thereof; a supporting member adapted to be mounted inside the lower tube and having the rod body mounted at the inside thereof by means of insert-injection; and a pressurizing member mounted at the screw thread portion formed along the outer periphery of the rod body in such a manner as to encompass the tapered member.

Advantageous Effect

According to the present invention, there is provided the sports stick with a variable length that provides a reliable fixing force between fixing means and the stick so as to stably maintain the adjusted length of the stick and to endure the relatively strong load applied to the stick, thereby preventing the stick from being easily folded.

Further, the fixing means and the stick have a reliable fixing relation with each other not by means of the point contact but by means of surface contact, thereby improving the conveniences in use and the reliability of the product.

Moreover, the sports stick with a variable length of the present invention is applicable to a climbing stick, a ski pole, a fishing rod, a tent pole, leisure and sports fields, and various industrial fields.

Figure 1:
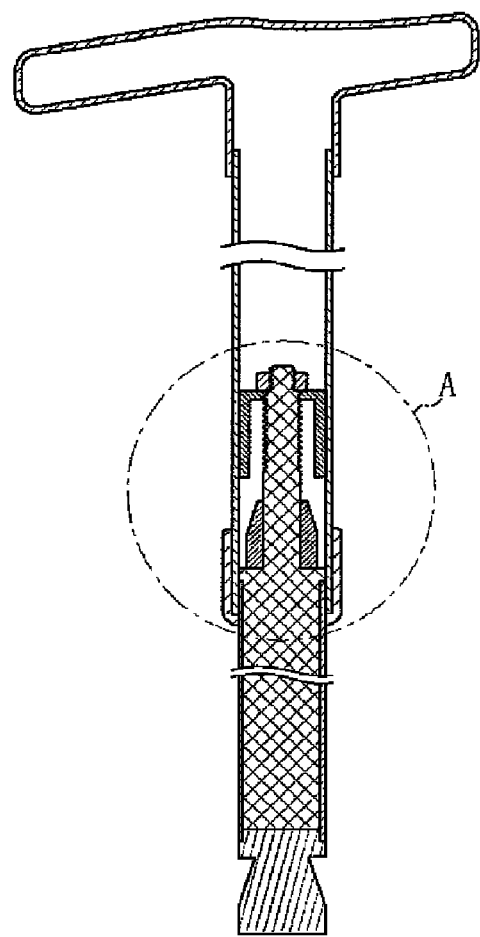
FIG. 1 is a cross-sectional view showing a conventional sports stick.
Figure 2:
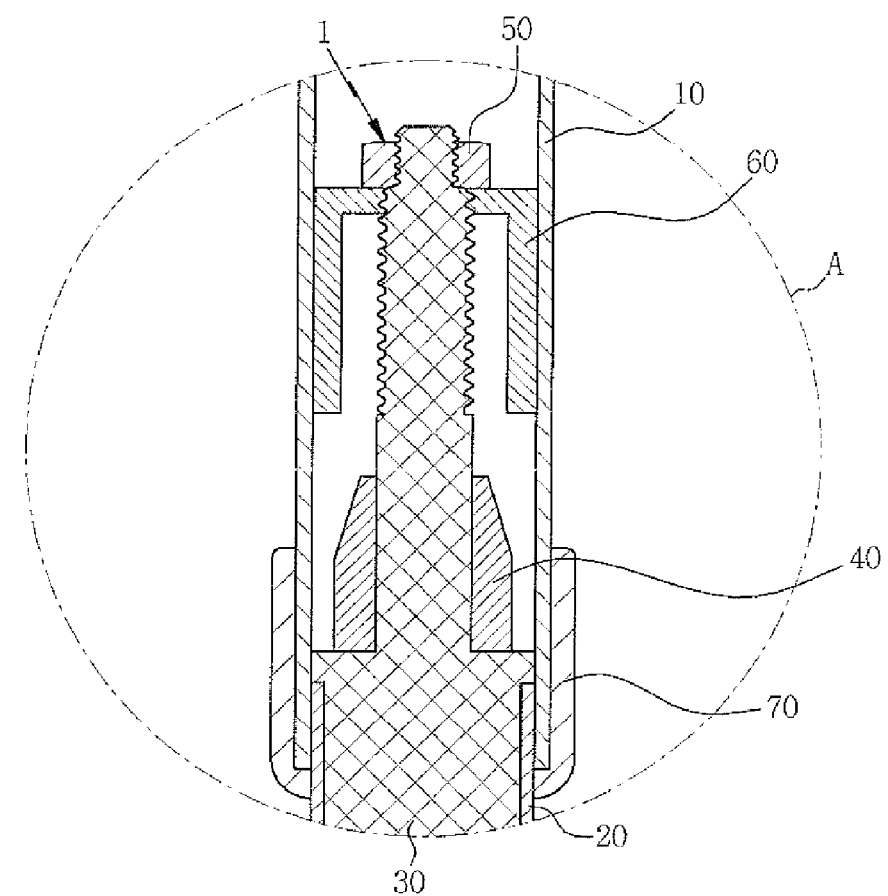
FIG. 2 is a cross-sectional view showing a portion 'A' in FIG. 1 wherein the fixing means of the conventional sports stick is released from its fixing state.
Figure 3:
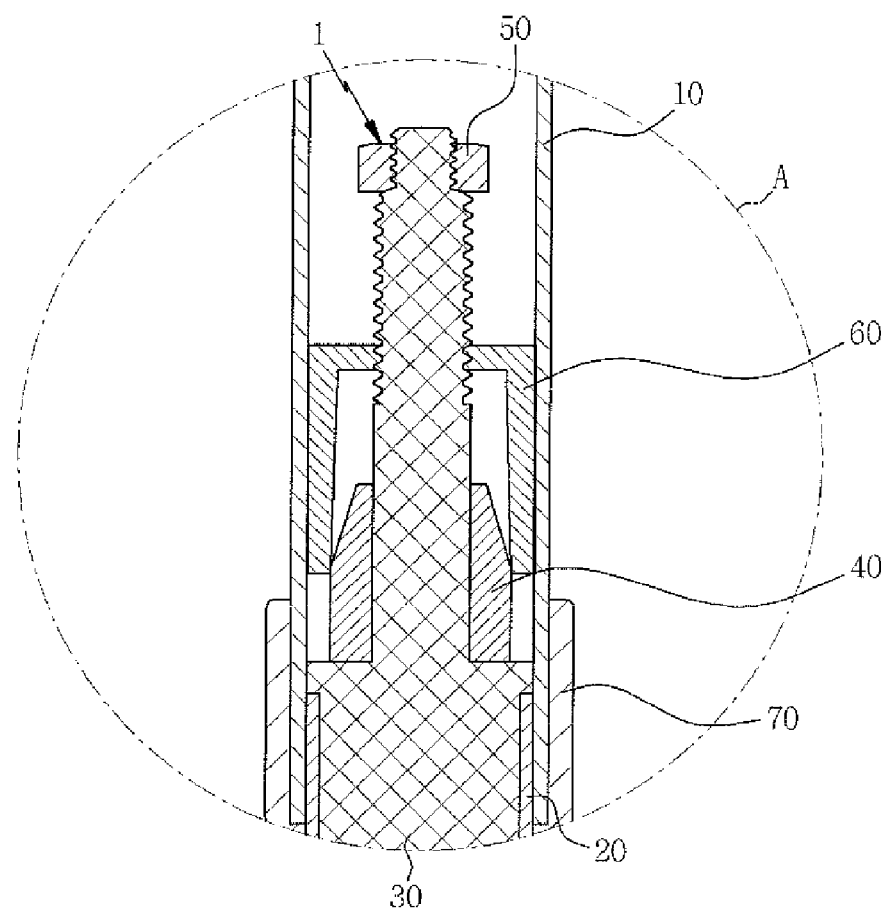
FIG. 3 is a cross-sectional view showing the portion 'A' in FIG. 1 wherein the fixing means of the conventional sports stick is at a fixing state.

EXPLANATIONS ON THE REFERENCE NUMERALS OF THE MAIN PARTS IN THE DRAWINGS 100, 200: fixing means
110, 310: upper tube
120, 320: lower tube
130, 230: rod body
130a, 230a: screw thread portion
130b: flat portion
131, 291: lower tube-retaining step
135: ring member
140, 240: tapered member
150, 250: escape-preventing member
160, 260: pressurizing member
162, 262: first slit
164, 264: second slit
170, 270: cap member
230b: first flat portion
230c: second flat portion
234: tapered member-retaining step
235: first retaining step
236: second retaining step
237: groove
252: protrusion
268: pressurizing piece
278: pin member
280: moving nut
282: pressurizing member-fitting portion
290: supporting member
292: first insertion hole
295: first retaining groove
296: second retaining groove
322: second insertion hole

BEST MODE FOR CARRYING OUT THE INVENTION (Explanation on the Configuration and Operation of a Sports Stick with a Variable Length According to a First Embodiment of the Present Invention)

Figure 4:
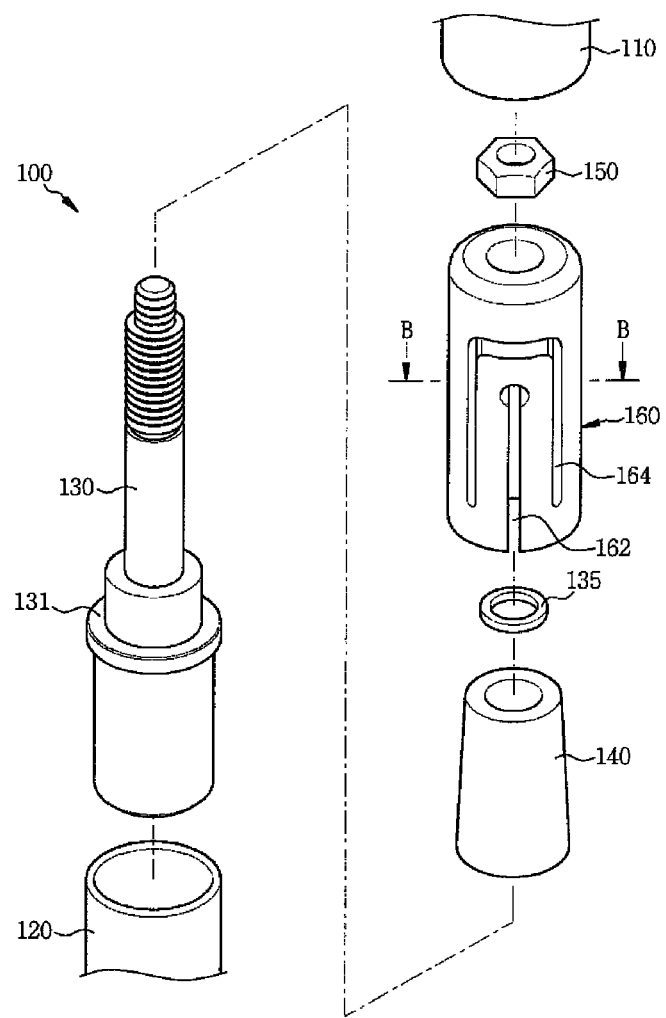
FIG. 4 is an exploded perspective view showing fixing means in a sports stick with a variable length according to a first embodiment of the present invention.
Figure 5:
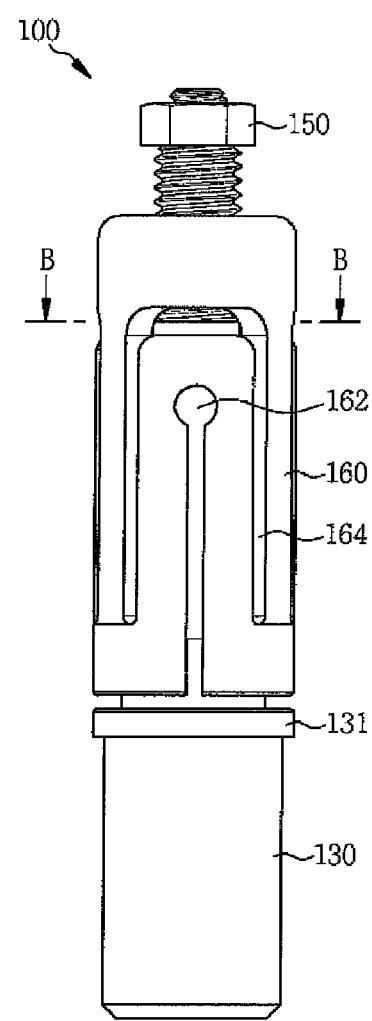
FIG. 5 is an assembled front view showing the fixing means in the sports stick with a variable length according to the first embodiment of the present invention.
Figure 6:
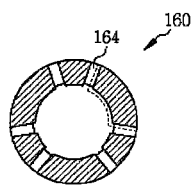
FIG. 6 is a cross-sectional view showing the line B-B of FIG. 4.

FIG. 4 is an exploded perspective view showing fixing means in a sports stick with a variable length according to a first embodiment of the present invention, FIG. 5 is an assembled front view showing the fixing means in the sports stick with a variable length according to the first embodiment of the present invention, and FIG. 6 is a cross-sectional view showing the line B-B of FIG. 4. As shown in FIGS. 4, 5 and 6, there is provided a sports stick with a variable length including an upper tube 110 to which a hand grip is connected, a lower tube 120 adapted to be inserted into and withdrawn from the upper tube 110, and fixing means 100 adapted to securely fix the lower tube 120 to the upper tube 110, wherein the fixing means 100 includes: a rod body 130, a tapered member 140 and a pressurizing member 160.

The rod body 130 has a screw thread portion 130a and a flat portion 130b formed sequentially along the outer periphery thereof. The screw thread portion 130a has a plurality of screw threads formed along the outer periphery of the rod body 130 and the flat portion 130b has no screw threads formed along the outer periphery of the rod body 130. The rod body 130 is disposed inside the lower tube 120 at one side periphery thereof in such a manner as to be mounted inside the upper tube 110 at the other side periphery thereof. The screw thread portion 130a of the rod body 130 is coupled to the inner periphery of the tapered member 140, and the flat portion 130b of the rod body 130 is coupled to the inner periphery of the pressurizing member 160. At this time, a ring member 135 is mounted along the outer periphery of the rod body 130 between the screw thread portion 130a and the flat portion 130b so as to prevent the tapered member 140 from escaping from the rod body 130 by means of the pressurizing member 160. Also, the rod body 130 has a lower tube-retaining step 131 formed along the lower outer periphery thereof.

The tapered member 140 has a tapered surface formed along the outer periphery thereof and inserts the flat portion 130b formed along the outer periphery of the rod body 130 thereinto in such a manner as to have a large diameter at the lower portion thereof.

The pressurizing member 160 has a tapered surface formed along the inner periphery thereof in such a manner as to have the same inclination as the outer periphery of the tapered member 140. Also, the pressurizing member 160 is mounted at the screw thread portion 130a formed along the outer periphery of the rod body 130 in such a manner as to come into close contact with the tapered member 140 and to encompass the tapered member 140. The outer peripheral surface of the pressurizing member 160 is formed to come into close contact with the inner peripheral surface of the upper tube 110.

Further, the pressurizing member 160 has a plurality of first slits 162 and a plurality of second slits 164 formed along the circumferential surface thereof. The first slits 162 have a shape of 'I' extended from the lower end periphery of the pressurizing member 160 in a lengthwise direction thereof and the second slits 164 have a shape of '∩' along the upper outer periphery of the pressurizing member 160. The 'I'-shaped first slits 162 are formed below the '∩'-shaped second slits 164. The first slits 162 and the second slits 164 serve to make the diameter of the pressurizing member 160 easily extended by means of the tapered member 140 upon the operation of the fixing means 100. Also, the pressurizing member 160 is made of a synthetic resin material, or it may be made of other materials having an elastic force.

Next, the operations for coupling the fixing means 100 to the stick and for adjusting the length of the stick are described.

Figure 7:
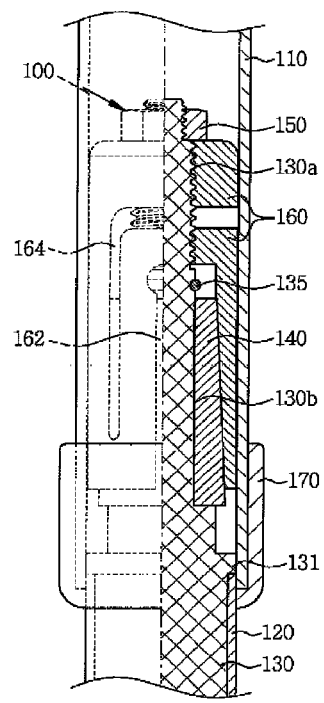
FIG. 7 is a half-sectional view showing the released state of the fixing means from the fixing state in the sports stick with a variable length according to the first embodiment of the present invention.
Figure 8:
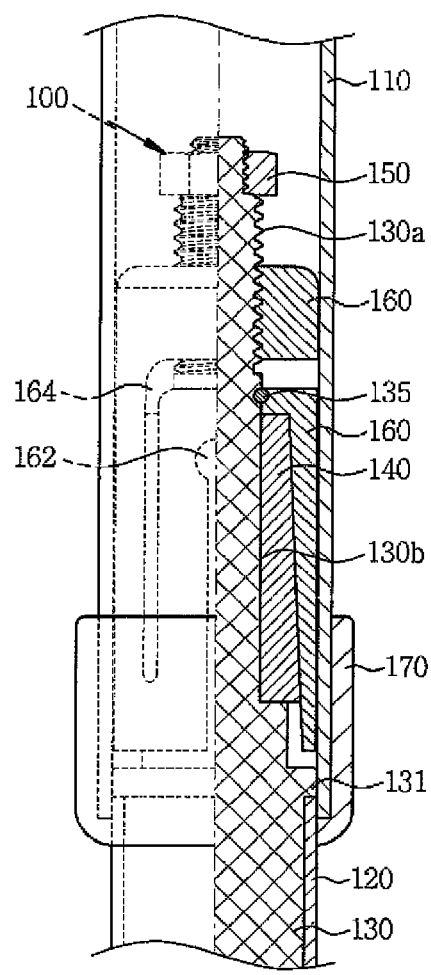
FIG. 8 is a half-sectional view showing the fixing state of the fixing means in the sports stick with a variable length according to the first embodiment of the present invention.

FIG. 7 is a half-sectional view showing the released state of the fixing means from the fixing state in the sports stick with a variable length according to the first embodiment of the present invention, and FIG. 8 is a half-sectional view showing the fixing state of the fixing means in the sports stick with a variable length according to the first embodiment of the present invention. As shown in FIGS. 7 and 8, the sports stick is configured to have its outer shape when the upper tube 110 and the lower tube 120 which are hollow at the inside thereof are coupled to each other. The upper tube 110 has the hand grip mounted along the top end periphery thereof and a cap member 170 mounted along the lower end periphery thereof. The lower tube 120 has a smaller diameter than the upper tube 110 and is adapted to be inserted into and withdrawn from the upper tube 110.

In the meanwhile, the fixing means 100 is mounted between the upper tube 110 and the lower tube 120, that is, on the connecting portion between the upper tube 110 and the lower tube 120, so as to securely fix the lower tube 120 to the upper tube 110.

The rod body 130 of the fixing means 100 is coupled to the upper end inner periphery of the lower tube 120 in such a manner as to be disposed inside the upper tube 110. At this time, the rod body 130 is fixed along the upper end inner periphery of the lower tube 120 by means of the lower tube-retaining step 131. The tapered member 140 is mounted along the flat portion 130b formed along the outer periphery of the rod body 130, and the pressurizing member 160 is mounted at the screw thread portion 130a formed along the outer periphery of the rod body 130. That is, as the pressurizing member 160 is moved upwardly and downwardly along the screw thread 130a formed along the outer periphery of the rod body 130, the inner peripheral surface of the pressurizing member 160 comes into strong and close contact with the tapered surface of the tapered member 140.

Moreover, the ring member 135 is mounted along the outer periphery of the rod member 130 between the flat portion 130b and the screw thread portion 130a formed sequentially along the outer periphery of the rod member 130, thereby preventing the tapered member 140 from escaping from the rod body 130. Further, the screw thread portion 130a of the rod body 130 has an escape-preventing member 150 mounted on the uppermost end outer periphery thereof. The escape-preventing member 150 serves to restrict the moving height of the pressurizing member 160 so as to prevent the pressurizing member 160 moving upwardly along the screw thread portion 130a of the rod body 130 from escaping from the rod body 130.

As shown in FIG. 7, in order to adjust the length of the stick, the fixing means 100 which is inserted into the upper tube 110 so as to securely fix the lower tube 120 to the upper tube 110 is first operated. After the lower tube 120 is released from its fixed state, the lower tube 120 is withdrawn from the upper tube 110 to its desired length.

That is, if the upper tube 110 is turned in a screw-unfastening direction in the state where the lower tube 120 is taken by a user's hand, the pressurizing member 160 of the fixing means 100 is moved upwardly along the screw thread portion 130a formed along the outer periphery of the rod body 130 by the force generated upon turning the upper tube 110. This is because a tense friction force exists between the outer peripheral surface of the pressurizing member 160 and the inner peripheral surface of the upper tube 110. At this time, since the pressurizing member 160 is moved along the tapered surface of the tapered member 140, the diameter of the pressurizing member 160 becomes small to reduce the friction force against the tapered member 140 such that the fixing state to the upper tube 110 is released to easily draw the lower tube 120 from the upper tube 110.

As shown in FIG. 8, after the lower tube 120 is withdrawn from the upper tube 110, the fixing means 100 is operated again to securely fix the lower tube 120 to the upper tube 110 so as not to move upwardly and downwardly the lower tube 120 anymore.

In other words, if the upper tube 110 is turned in an opposite direction (screw-fastening direction) to the direction upon fixing the lower tube 120 in the state where the lower tube 120 is taken by the user's hand, the pressurizing member 160 of the fixing means 100 is moved downwardly along the screw thread portion 130a formed along the outer periphery of the rod body 130. At this time, since the pressurizing member 160 is moved along the tapered surface of the tapered member 140, the diameter of the pressurizing member 160 become large to allow the inner peripheral surface thereof to be completely surface-contacted with the tapered member 140. Also, the outer peripheral surface of the pressurizing member 160 comes in strong and close contact with the upper tube 110 to allow the lower tube 120 to be fixed to the upper tube 110, thereby maintaining the adjusted length of the sports stick.

Since the conventional pressurizing member becomes large only at the diameter of the lower end portion thereof, it just has the first slits 162. However, since the pressurizing member of the present invention becomes large at the entire diameter thereof by the tapered surface formed from the upper outer periphery to the lower outer periphery of the tapered member 140, it further has the second slits 164.

According to the present invention, the number of each of the first slits 162 and the second slits 164 is three, but it is not limited thereto.

Furthermore, the first slits 162 and the second slits 164 are not limited to the shapes of 'I' and '∩', and may have other shapes.

The sports stick with a variable length according to the present invention is applicable to a climbing stick, a ski pole, a fishing rod, a tent pole and the like.

(Explanation on the Configuration and Operation of a Sports Stick with a Variable Length According to a Second Embodiment of the Present Invention)

Figure 9:
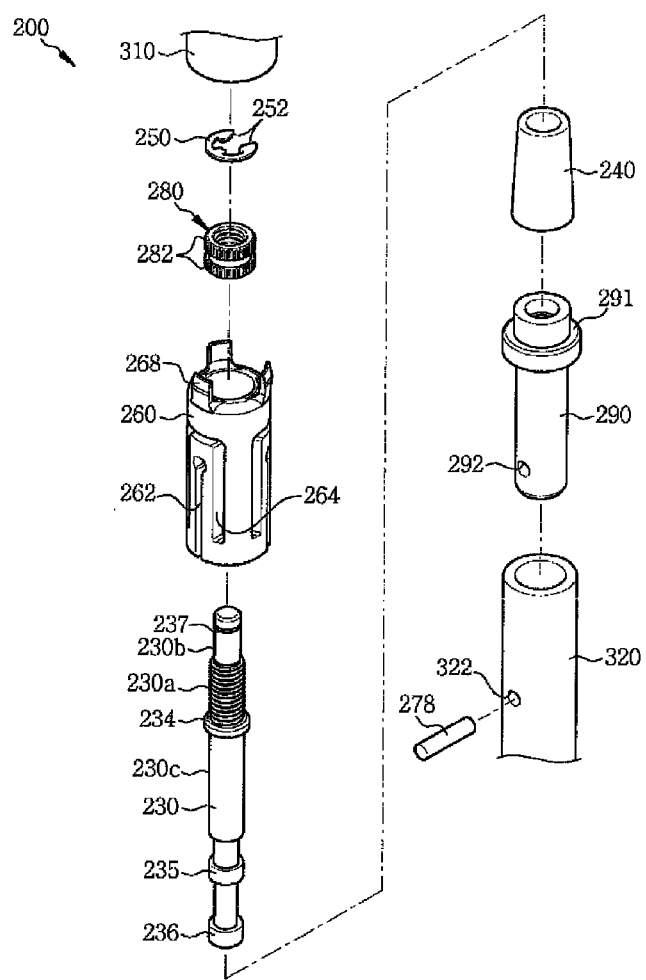
FIG. 9 is an exploded perspective view showing fixing means in a sports stick with a variable length according to a second embodiment of the present invention.
Figure 10:
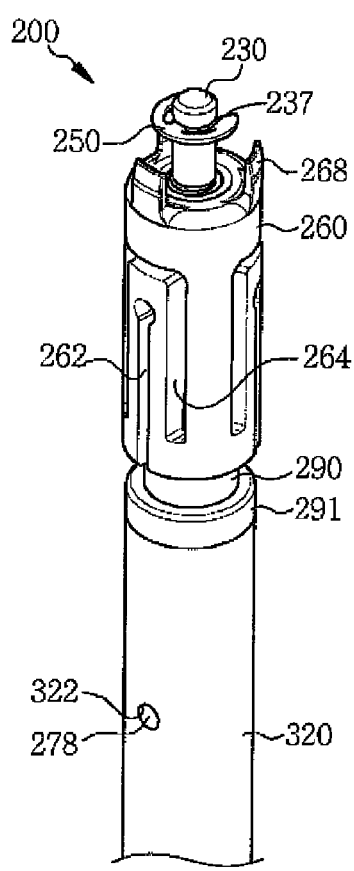
FIG. 10 is an assembled front view showing the fixing means in the sports stick with a variable length according to the second embodiment of the present invention.

FIG. 9 is an exploded perspective view showing fixing means in a sports stick with a variable length according to a second embodiment of the present invention, and FIG. 10 is an assembled front view showing the fixing means in the sports stick with a variable length according to the second embodiment of the present invention. As shown in FIGS. 9 and 10, there is provided a sports stick with a variable length including an upper tube 310 to which a hand grip is connected, a lower tube 320 adapted to be inserted into and withdrawn from the upper tube 310, and fixing means 200 adapted to securely fix the lower tube 320 to the upper tube 310, wherein the fixing means 200 includes: a rod body 230 disposed inside the lower tube 320 at one side periphery thereof in such a manner as to be mounted inside the upper tube 310 at the other side periphery thereof by the sequential formation of a first flat portion 230b, a screw thread portion 230a and a second flat portion 230c along the outer periphery thereof; a tapered member 240 adapted to be fixed along the second flat portion 230c formed along the outer periphery of the rod body 230 and having a tapered surface formed along the outer periphery thereof; a supporting member 290 adapted to be mounted inside the lower tube 320 and having the rod body 230 mounted at the inside thereof by means of insert-injection; and a pressurizing member 260 mounted at the screw thread portion 230a formed along the outer periphery of the rod body 230 in such a manner as to encompass the tapered member 240.

The second flat portion 230c of the rod body 230 is coupled to the inner periphery of the tapered member 240, and the screw thread portion 230a of the rod body 230 is coupled to the inner periphery of the pressurizing member 260. At this time, a tapered member-retaining step 234 is formed along the outer periphery of the rod body 230 between the screw thread portion 230a and the second flat portion 230c so as to prevent the tapered member 240 from escaping from the rod body 230 by means of the pressurizing member 260. Also, the rod body 230 has first and second retaining steps 235 and 236 formed along the lower outer periphery thereof. Moreover, an escape-preventing member 250 is mounted along the top end periphery of the rod body 230 so as to prevent the pressurizing member 260 from escaping from the rod body 230. The escape-preventing member 250 is formed of an 'E'-shaped ring having a plurality of protrusions 252 formed along the inner periphery thereof in such a manner as to insert the protrusions 252 into a groove 237 formed along the top end outer periphery of the rod body 230, thereby preventing the pressurizing member 260 from escaping from the rod body 230.

The tapered member 240 has a tapered surface formed along the outer periphery thereof and inserts the second flat portion 230c of the rod body 230 thereinto in such a manner as to have a large diameter at the lower portion thereof.

The lower tube 320 has the tapered member 240 mounted along the outer periphery thereof and is mounted at the inside of the supporting member 290 by means of the insert-injection. The supporting member 290 has a first insertion hole 292 formed to pass through the lower portion thereof. Also, the lower tube 320 into which the supporting member 290 is inserted has a second insertion hole 322 formed at the corresponding position to the first insertion hole 292 of the supporting member 290, such that the supporting member 290 and the lower tube 320 are coupled to each other by means of the insertion of a pin member 278 into the first and second insertion holes 292 and 322. The supporting member 290 has a lower tube-retaining step 291 formed along the upper outer periphery thereof so as to be fixed to the lower tube 320.

The pressurizing member 260 has a tapered surface formed along the inner periphery thereof in such a manner as to have the same inclination as the outer periphery of the tapered member 240. The outer peripheral surface of the pressurizing member 260 comes into close contact with the inner peripheral surface of the upper tube 310. At this time, the pressurizing member 260 has at least one or more pressurizing pieces 268 formed along the top end periphery thereof.

Further, the pressurizing member 260 has a plurality of first slits 262 and a plurality of second slits 264 formed along the circumferential surface thereof. The first slits 262 and the second slits 264 are formed in the same manner as in the first embodiment of the present invention.

Also, the pressurizing member 260 has a moving nut 280 mounted at the inside thereof by means of the insert-injection in such a manner as to be moved upwardly and downwardly along the screw thread portion 230a formed along the outer periphery of the rod body 230. That is, the moving nut 280 has a pressurizing member-fitting portion 282 formed along the both side outer peripheries thereof so as to be fittedly mounted along the inner periphery of the pressurizing member 260 such that the pressurizing member 260 is moved along the screw thread portion 230a formed along the outer periphery of the rod body 230.

Next, the operations for coupling the fixing means 200 to the stick and for adjusting the length of the stick are described.

Figure 11:
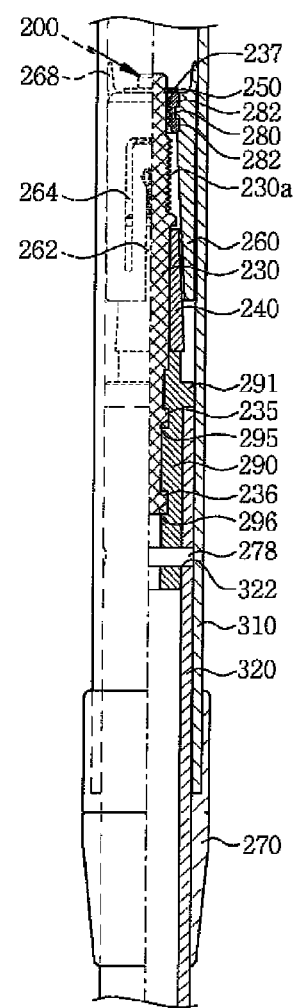
FIG. 11 is a half-sectional view showing the released state of the fixing means from the fixing state in the sports stick with a variable length according to the second embodiment of the present invention.
Figure 12:
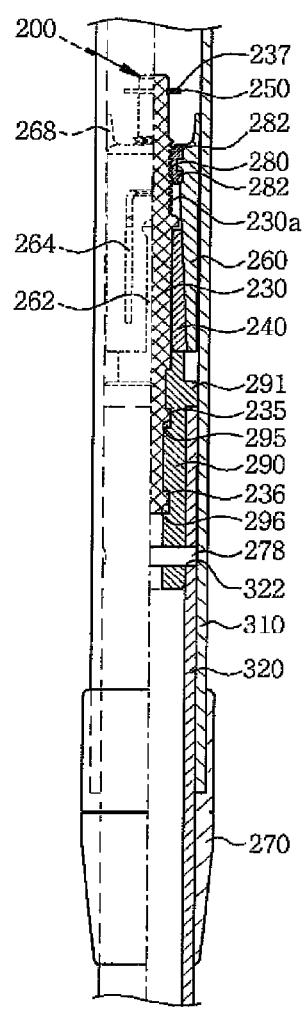
FIG. 12 is a half-sectional view showing the fixing state of the fixing means in the sports stick with a variable length according to the second embodiment of the present invention.

FIG. 11 is a half-sectional view showing the released state of the fixing means from the fixing state in the sports stick with a variable length according to the second embodiment of the present invention, and FIG. 12 is a half-sectional view showing the fixing state of the fixing means in the sports stick with a variable length according to the second embodiment of the present invention. As shown in FIGS. 11 and 12, the rod body 230 is mounted at the inside of the tapered member 240 and is mounted at the inside of the supporting member 290 by means of the insert-injection. At this time, the first and second retaining steps 235 and 236 of the rod body 230 are rigidly coupled correspondingly to first and second retaining grooves 295 and 296 formed along the inner periphery of the supporting member 290. Also, the supporting member 290 and the lower tube 320 are more rigidly coupled to each other by means of the pin member 278 inserted into the first and second insertion holes 292 and 322 formed thereon.

The tapered member 240 is mounted along the second flat portion 230c of the rod body 230, and the pressurizing member 260 adapted to encompass the tapered member 240 is mounted at the screw thread portion 230a of the rod body 230. The escape-preventing member 250 is mounted on the top end periphery of the first flat portion 230b of the rod body 230 so as to prevent the pressurizing member 260 from escaping from the rod body 230 while the pressurizing member 260 is being moved upwardly along the screw thread portion 230a by means of the moving nut 280.

An operation of the fixing means 200 according to the second embodiment of the present invention is carried out in the same manner as according to the first embodiment of the present invention.

That is, as shown in FIG. 11, if the lower tube 320 is turned in the state where the upper tube 310 is taken by a user's hand to allow the fixing means 200 to be released from the fixing state, the pressurizing member 260 is moved upwardly along the screw thread portion 230a formed along the outer periphery of the rod body 230. At this time, if the pressurizing member 260 is completely released from its fixing state, the pressurizing member 260 is moved along the tapered surface of the tapered member 240 to the first flat portion 230b on which the escape-preventing member 250 is mounted. That is, the diameter of the pressurizing member 260 becomes small such that the fixing state of the fixing means 200 is released to adjust the length of the stick.

Also, since the pressurizing pieces 268 are brought into close contact with the inner peripheral surface of the upper tube 310, the pressurizing member 260 are kept coming into close contact with the upper tube 310 even in the state where the fixing means 200 is released from its fixing state.

Moreover, as shown in FIG. 12, after the length of the stick is adjusted if the lower tube 320 is turned in the state where the upper tube 310 is taken by the user's hand to allow the fixing means 200 to be operated, the pressurizing member 260 is moved downwardly along the screw thread portion 230a formed along the outer periphery of the rod body 230. At this time, the pressurizing member 260 is moved along the tapered surface of the tapered member 240 and becomes large in diameter by means of the first and second slits 262 and 264, thereby being brought into completely close contact with the tapered member 240 and the lower tube 320.

INDUSTRIAL APPLICABILITY

As described above, the sports stick with a variable length according to the present invention provides a reliable fixing force between the fixing means and the stick so as to stably maintain the adjusted length of the stick and to endure the relatively strong load applied to the stick, thereby preventing the stick from being easily folded.

Further, the fixing means and the stick have a reliable fixing relation with each other not by means of the point contact but by means of surface contact, thereby improving the conveniences in use and the reliability of the product.

Moreover, the sports stick with a variable length of this invention is applicable to a climbing stick, a ski pole, a fishing rod, a tent pole, leisure and sports fields, and various industrial fields.

The invention claimed is:

1. A sports stick with a variable length including an upper tube to which a hand grip is connected, a lower tube adapted to be inserted into and withdrawn from the upper tube, and fixing means adapted to securely fix the lower tube to the upper tube, wherein the fixing means comprises:

a rod body disposed inside the lower tube at one side periphery thereof in such a manner as to be mounted inside the upper tube at the other side periphery thereof by the sequential formation of a screw thread portion and a flat portion along the outer periphery thereof;

a tapered member adapted to be fixed to the flat portion formed along the outer periphery of the rod body and having a tapered surface formed along the outer periphery thereof; and a pressurizing member mounted at the screw thread portion formed along the outer periphery of the rod body in such a manner as to encompass the tapered member, wherein the pressurizing member has a plurality of first slits and a plurality of second slits formed along the circumferential surface thereof, and wherein the first slits have a shape of an 'I' and the second slits have a shape of '∩'.

2. The sports stick with a variable length according to claim 1, wherein the rod body comprises a ring member mounted along the outer periphery thereof between the screw thread portion and the flat portion so as to prevent the tapered member from escaping from the rod body.

3. The sports stick with a variable length according to claim 2, wherein the rod body comprises an escape-preventing member mounted on the upper end outer periphery thereof so as to prevent the pressurizing member from escaping from the rod body.

4. The sports stick with a variable length according to claim 3, wherein the rod body comprises a lower tube-retaining step formed along the lower outer periphery thereof.

5. The sports stick with a variable length according to claim 1, wherein the pressurizing member has a tapered surface formed along the inner periphery thereof in such a manner as to have the same inclination as the outer periphery of the tapered member and to come into close contact with the tapered surface of the tapered member, and the outer peripheral surface of the pressurizing member is formed to come into close contact with the inner peripheral surface of the upper tube.

6. The sports stick with a variable length according to claim 1, wherein the pressurizing member is made of a synthetic resin material.

7. The sports stick with a variable length according to claim 1, wherein the first slits are formed below the second slits.

* * * * *